United States Patent [19]
Thacker et al.

[11] Patent Number: 5,820,163
[45] Date of Patent: Oct. 13, 1998

[54] TILTING, TELESCOPING AND ENERGY ABSORBING STEERING COLUMN

[75] Inventors: Clarke Fisk Thacker, Farmington Hills; Cheryl Beth Goldstein, Canton, both of Mich.

[73] Assignee: Ford Global Technologies, Inc., Dearborn, Mich.

[21] Appl. No.: 676,789

[22] Filed: Jul. 8, 1996

[51] Int. Cl.⁶ .................................................. B62D 1/19
[52] U.S. Cl. .......................... 280/775; 280/777; 74/493; 74/527
[58] Field of Search .................. 280/775, 777; 74/493, 527; 188/371

[56] References Cited

U.S. PATENT DOCUMENTS

| | | | |
|---|---|---|---|
| 2,910,887 | 11/1959 | Helms | 74/493 |
| 3,245,282 | 4/1966 | Kimberlin | 280/75 |
| 5,009,120 | 4/1991 | Iseler et al. | 74/493 |
| 5,029,489 | 7/1991 | Burmeister et al. | 74/493 |
| 5,078,022 | 1/1992 | Ichikawa | 74/493 |
| 5,143,402 | 9/1992 | Higashino et al. | 280/775 |
| 5,161,425 | 11/1992 | Baskett et al. | 74/493 |
| 5,193,848 | 3/1993 | Faulstroh | 280/775 |
| 5,269,562 | 12/1993 | Peitsmeier et al. | 280/775 |
| 5,282,394 | 2/1994 | Dominique et al. | 74/493 |
| 5,520,416 | 5/1996 | Singer, III et al. | 280/775 |
| 5,562,307 | 10/1996 | Connor | 280/777 |

FOREIGN PATENT DOCUMENTS 2-291-840  2/1996  United Kingdom .

OTHER PUBLICATIONS

Jaguar Service manual, Issue 1, Aug. 1994, pp. 1, 10.1, Steering System Description (with separate page, two polaroid snapshots).

Primary Examiner—Peter C. English
Attorney, Agent, or Firm—Gregory P. Brown

[57] ABSTRACT

A tilting and telescoping steering column assembly having internal energy absorbing capabilities. The assembly comprises a main housing (12, 13), a telescoping housing (26), and a tilt head (82). The telescoping housing and tilt head are locked by a pair of telescoping and tilt locks (44,88) which are selectively engaged by an operator through first and second levers (56,86) connected thereto with flexible cables (54,84). An energy absorbing device, such as a curl strap (68), may be incorporated to provide additional energy management control.

12 Claims, 5 Drawing Sheets

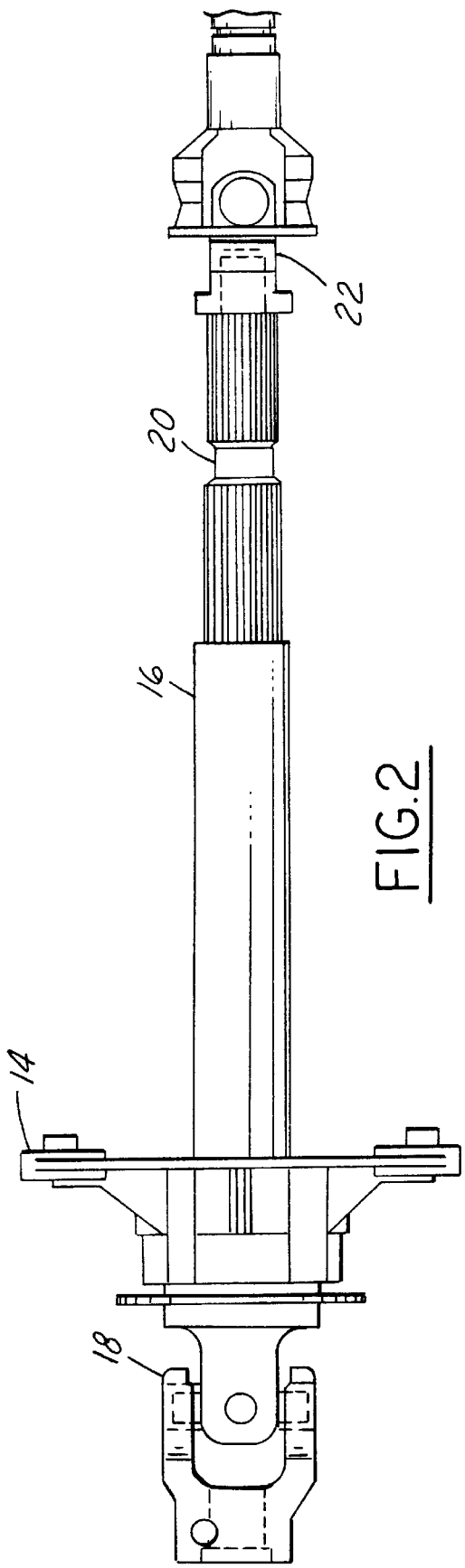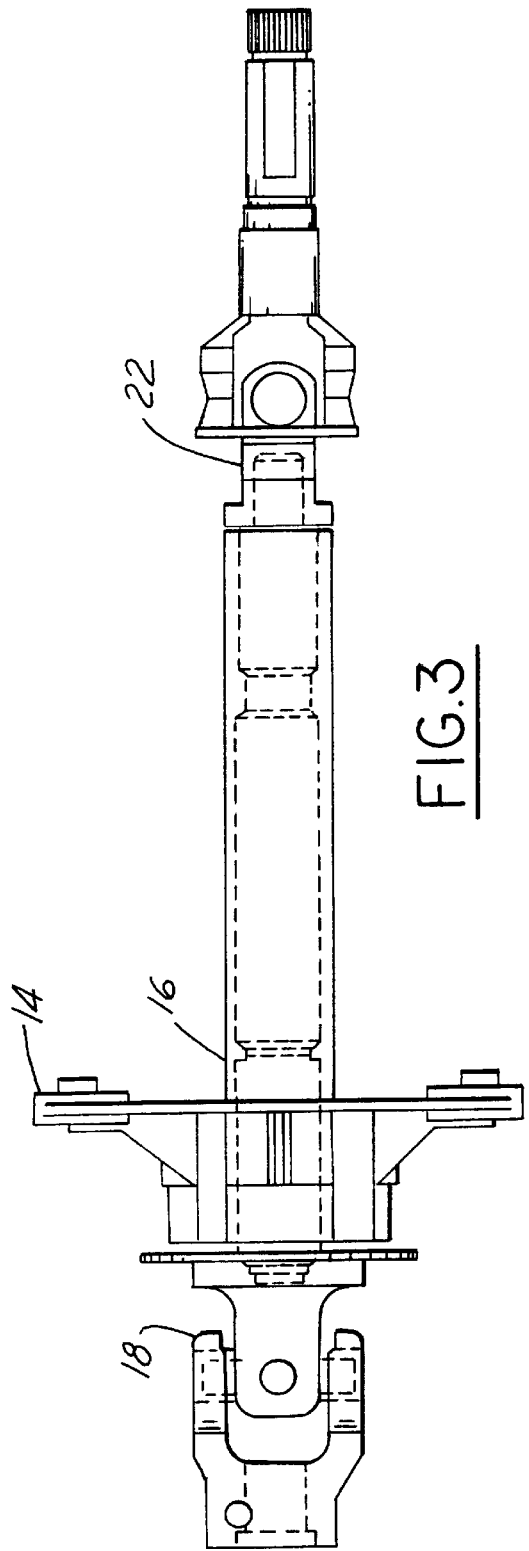

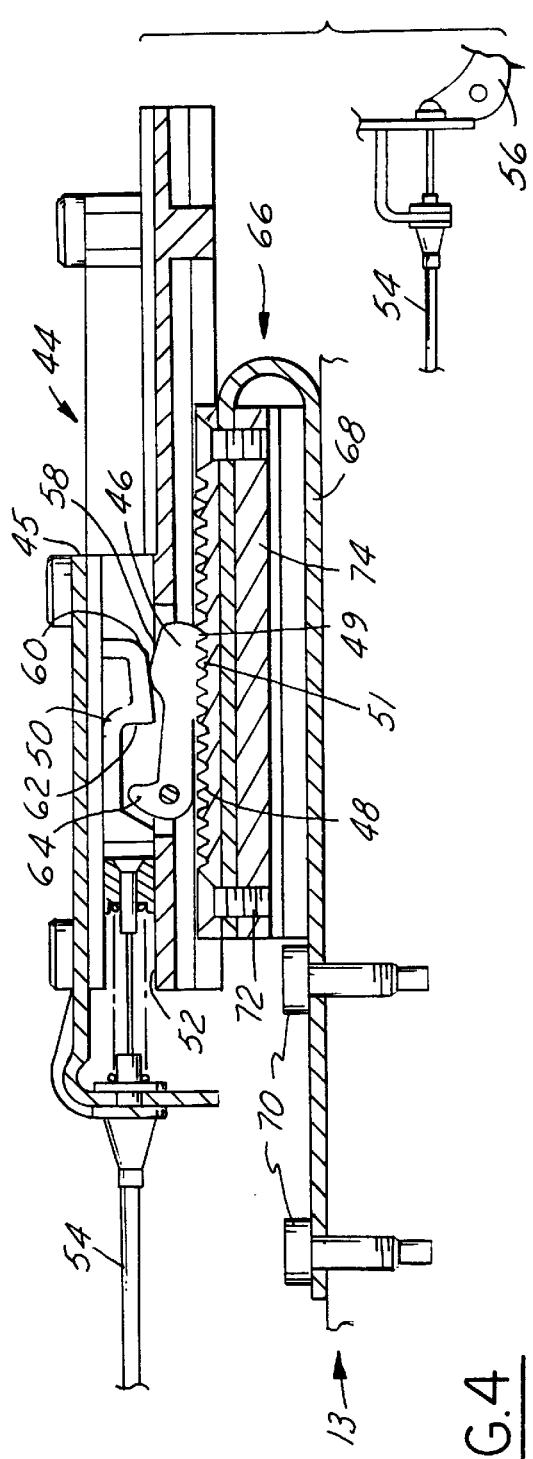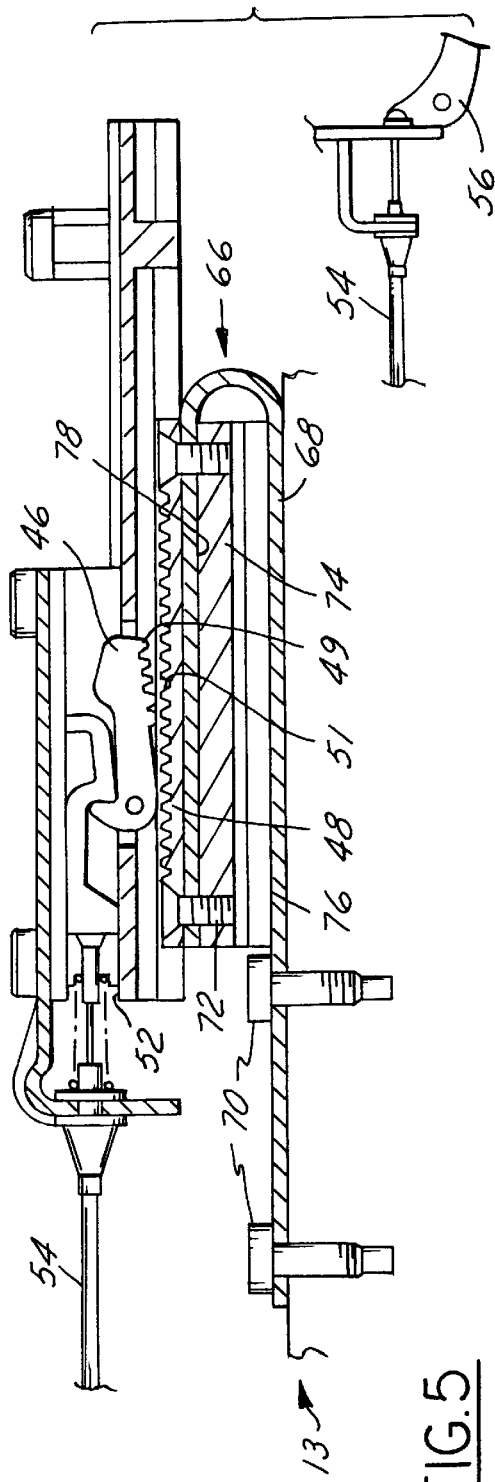

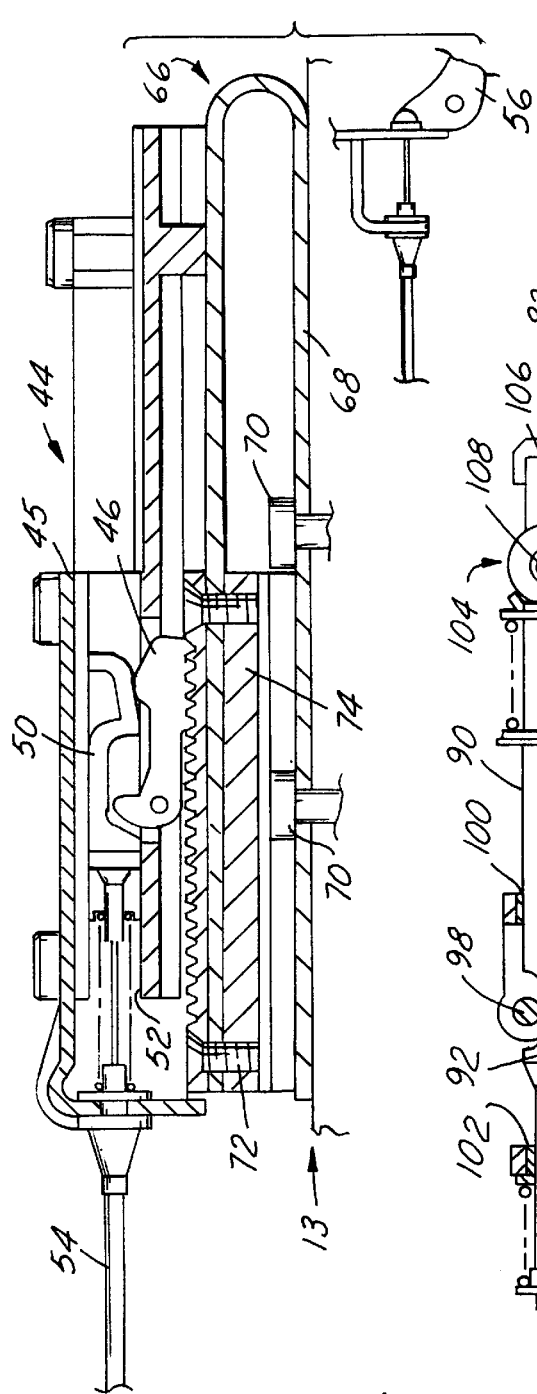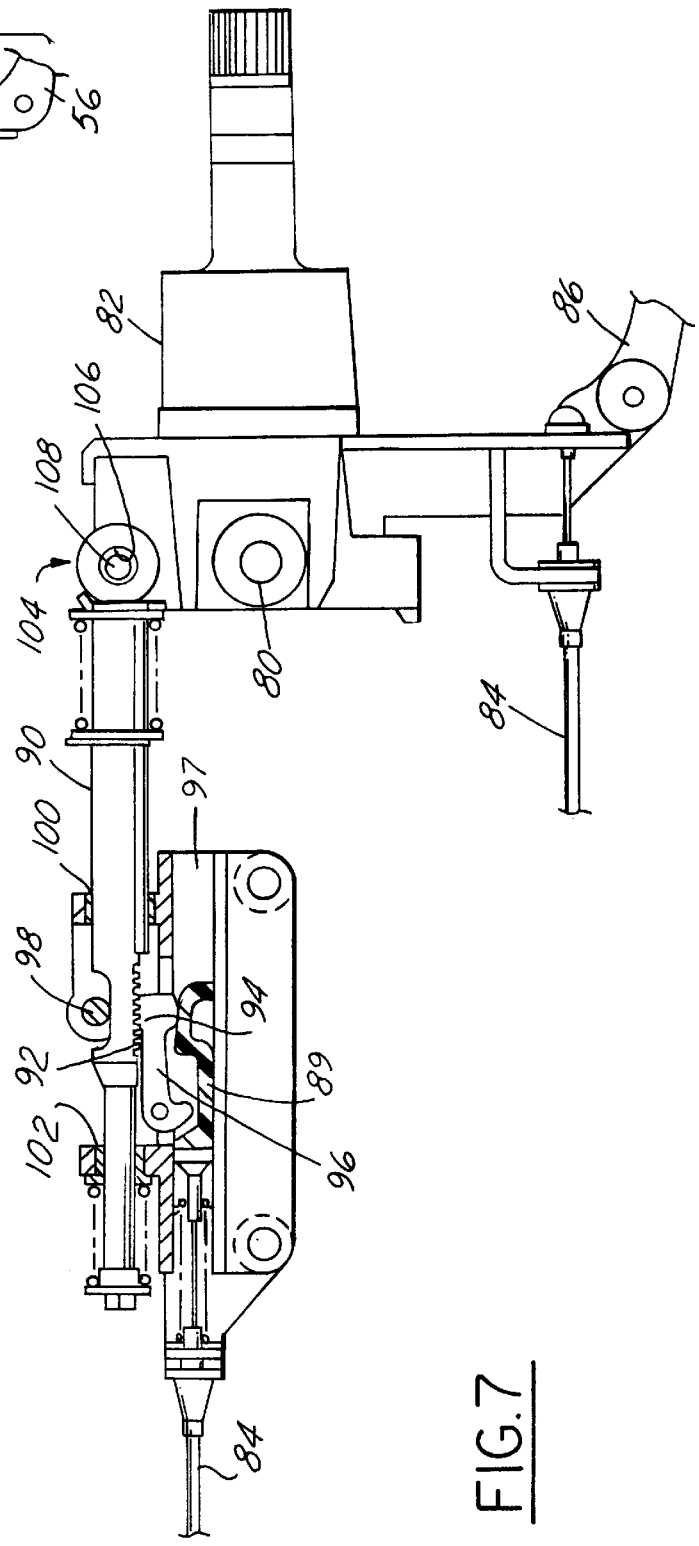

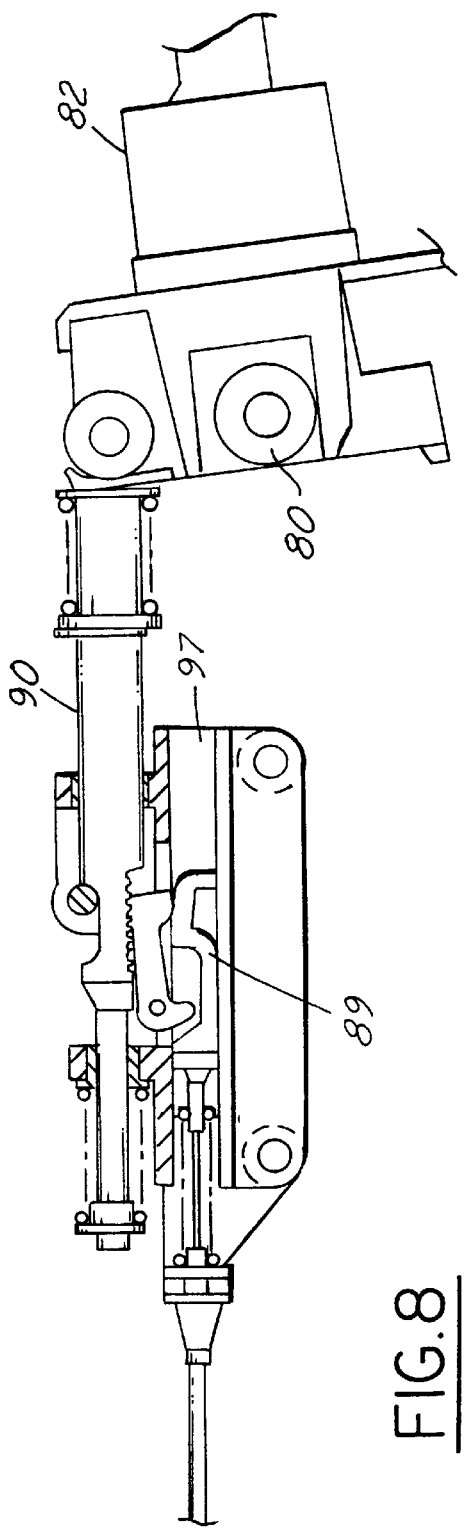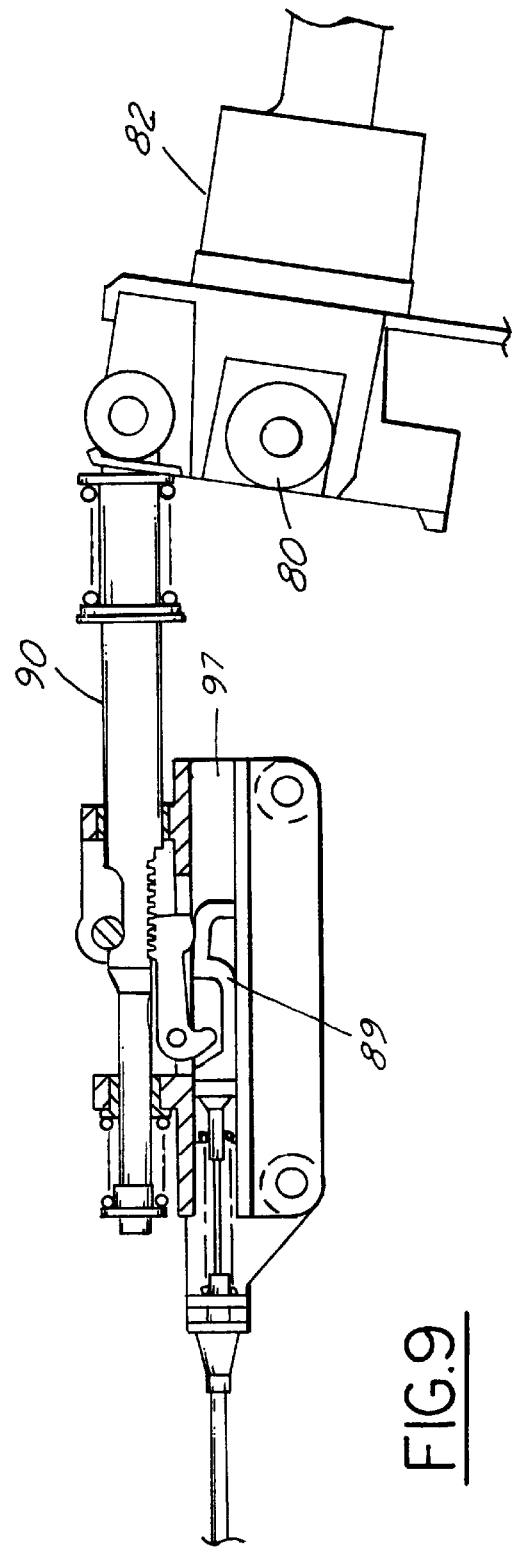

TILTING, TELESCOPING AND ENERGY ABSORBING STEERING COLUMN

BACKGROUND OF THE INVENTION

1. Field of the Invention

This application is related to co-pending Ser. No. 08/316,961 entitled "Power Tilt Telescoping and Internally Collapsible Steering Column" filed Oct. 3, 1994, now U.S. Pat. No. 5,520,416. This invention relates to vehicle steering columns as used in motor vehicles. More particularly, energy absorbing steering columns with tilt and telescoping functions.

2. Disclosure Information

A variety of tilting and telescoping steering column arrangements have been developed in the field of automotive vehicles. In such tilting and telescoping steering column arrangements the telescoping mechanism is usually arranged as follows: a part of the steering shaft on which a steering wheel is mounted is axially slidably fixed in a fixed tube fastened to a movable bracket, in which the splines of the part of the steering shaft are in engagement with the splines of the fixed tube. This allows the steering shaft to axially move relative to the fixed tube. The steering shaft is co-axially fixed with a telescopic upper jacket which is co-axially fixed with a telescopic lower jacket fixed to the movable bracket. The telescopic upper jacket is formed with a threaded portion which is engaged with a threaded portion of a telescopic sleeve. The telescopic sleeve is rotated around its axis by an electric motor thus actually displacing the steering shaft.

However, telescopic motions of the steering shaft are accomplished under engagement of external and internal threads in which the external and internal threads displace axially relative to each other upon rotation. Since such engagement of the external and internal threads are considerably high in frictional resistance, a relatively large force is required to axially displace a steering shaft. Accordingly, in this system it is desirable to use an electric motor having sufficient torque capacity to displace the steering shaft. Electric motors capable of generating sufficient torque are characterized by high cost. As a result, electronically operated telescopic mechanism are not only costly, but they are also difficult to package.

Tilting functions are also commonplace. Many configurations are available in the prior art for steering column tilt mechanisms. However, many of the prior art systems are cumbersome and bulky, thus resulting in packaging and cost problems.

It would be desirable to provide a manual tilting and telescoping steering column assembly which is easy to use and low in cost and complexity as well as package efficient. Additionally, it would be further desirable to provide a telescoping steering column assembly that controls energy absorption during the entire stroke of a collapsing column.

SUMMARY OF THE INVENTION

A steering column having both tilt and telescopic adjustability is provided. The steering column comprises a main housing rigidly secured to the motor vehicle. Disposed within the main housing is a telescoping assembly which includes a telescopic housing slidably connected to the main housing. A first flexible cable is driven by a first lever which is connected to the telescopic housing in a manner that is accessible to the operator.

A telescope lock located between the main housing and the telescopic housing locks the two together to prevent relative motion therebetween. The telescope lock is driven by the first cable. An energy absorbing device is connected between the telescopic housing and the main housing for absorbing energy of movement of the telescopic housing with respect to the main housing upon application of an axial force in excess of a predetermined minimum force.

Accordingly, an object of the present invention is to provide a tilting and telescoping steering column apparatus. It is a further object of the present invention to provide a tilting and telescoping steering apparatus which is internally collapsible in order to allow controlled energy absorption throughout the maximum possible stroke of the steering column.

BRIEF DESCRIPTION OF THE DRAWING

FIG. 2 is partial top view of an axially extended steering shaft for use in a steering column assembly according to the present invention.

FIG. 3 is partial top view of an axially compressed steering shaft for use in a steering column assembly according to the present invention.

FIG. 4 is a partial side view illustrating a telescoping lock mechanism engaged in a medial position and a cooperating curl strap in accordance with the present invention.

FIG. 5 is a partial side view illustrating a telescoping lock mechanism disengaged in a medial position and a cooperating curl strap in accordance with the present invention.

FIG. 6 is a partial side view illustrating a telescoping lock mechanism engaged in an extended position and a cooperating curl strap after having absorbed energy in accordance with the present invention.

FIG. 7 is a partial side view illustrating a tilt lock mechanism engaged in a medial position in accordance with the present invention.

FIG. 8 is a partial side view illustrating a tilt lock mechanism engaged with the steering wheel tilted in an upward position in accordance with the present invention.

FIG. 9 is a partial side view illustrating a tilt lock mechanism engaged with the steering wheel tilted in a downward position in accordance with the present invention.

DETAILED DESCRIPTION OF THE PREFERRED EMBODIMENT

Figure 1:
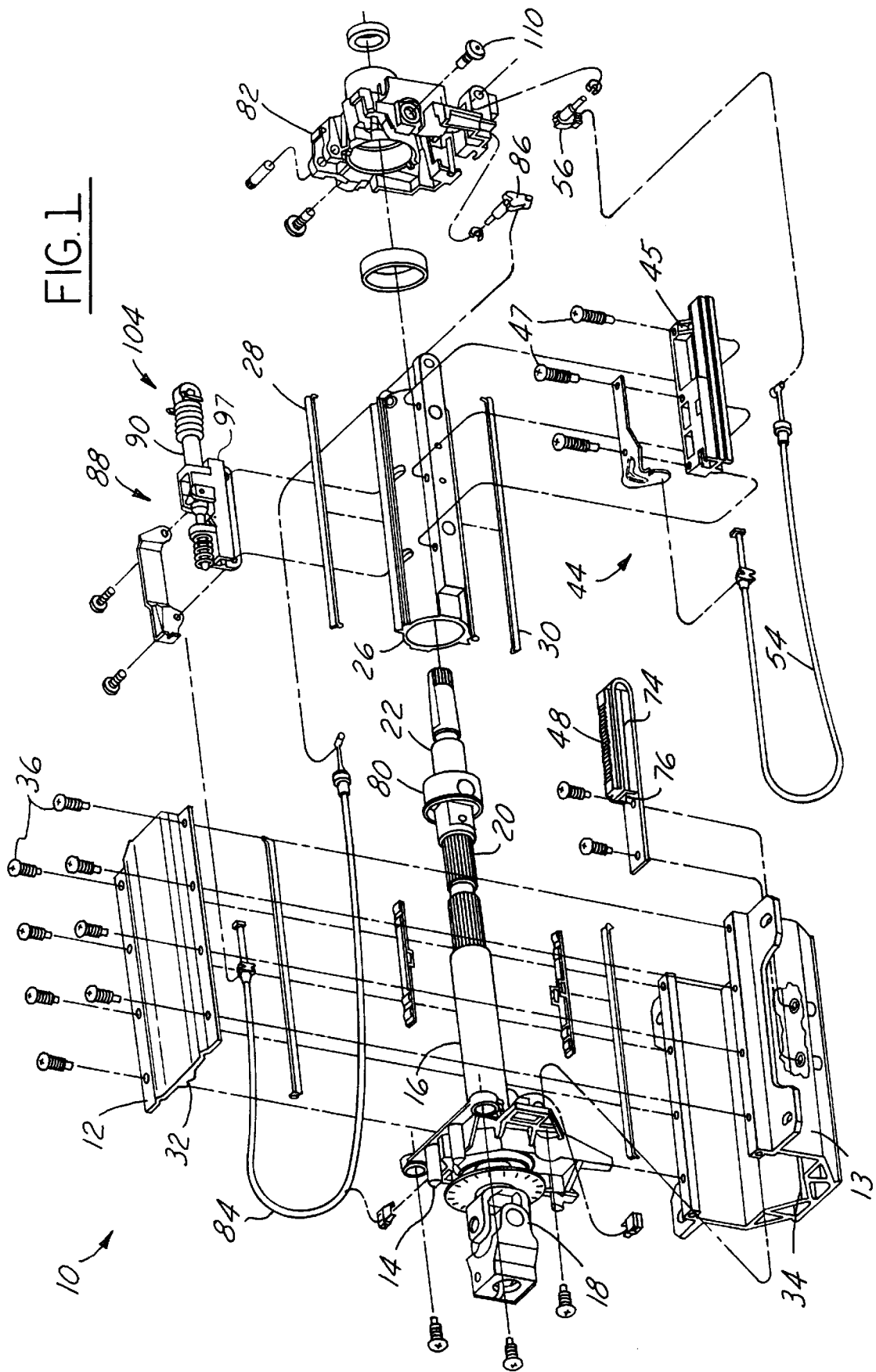
FIG. 1 is an exploded perspective view of a steering column assembly according to the present invention.

Referring now to FIG. 1, a steering column 10 is provided. An upper and lower portion form a main housing 12, 13 which is connected to a lower bearing retainer 14 having a lower steering shaft 16 pass therethrough. The lower shaft 16 is connected to a U-joint 18, which is connected to an intermediate shaft leading to the vehicle steering gear input shaft. The lower shaft 16 is internally splined in order to receive a central shaft 20. An upper shaft 22 is also internally splined to receive the other end of the central shaft 20 and is adapted to receive a steering wheel (not shown) opposite therefrom.

As can be seen in FIGS. 2 and 3, the upper and central shafts move with respect to the lower shaft 16 along a common longitudinal axis as the steering column telescopes in and out. Furthermore, a large gap between the lower and upper shafts 16, 22 allows the central shaft 20 to collapse into the lower shaft 16 a predetermined distance. In the presently preferred embodiment four inches of stroke may be accommodated. The total stroke is not necessarily for telescopic adjustment, rather, this stroke permits a gradual compression of the steering column under an axially compressive load in excess of a predetermined minimum for controlled energy absorption.

Referring back to FIG. 1, the lower and upper shafts 16, 22 move through a central axial opening in a telescopic housing 26. The telescopic housing 26 moves in and out with respect to the main housing. Plastic tracks 28, 30 guide movement of the telescopic housing 26 with respect to the main housing and are connected to the telescopic housing 26 and ride in V-grooves 32, 34 in the upper and lower portions of the main housing 12, 13. The upper portion 12 of the main housing is screwed to the lower portion 13 of the main housing by support screws 36. The support screws 36 hold the upper portion 12 of the main housing in a bent position over the top of the plastic track 28 in order to provide a pre-load upon the plastic track 28. To reduce the adjustment efforts it may be desirable to substitute steel tracks and a ball and ball retainer for the plastic tracks 28, 30.

Referring now to FIGS. 1 and 4, a telescope lock 44 locks the telescoping housing 26 in an operating position selected by an operator. The telescope lock 44 includes a lock body 45 secured to the telescopic housing 26 with threaded fasteners 47. The lock body 45 positions a pawl 46 for engagement with a rack 48 that is secured to the lower portion of the main housing 13. In the preferred embodiment, the pawl 46 and the rack 48 include mating straight cut teeth 49, 51 for positive, no-slip engagement.

An actuator cam 50 is slidably disposed within a channel 52 in the lock body 45. A sheathed cable 54 extends from an operating lever 56 accessible to the vehicle operator to the actuator cam 50. Rotation of the operating lever 56 displaces the cable 54, which in turn displaces the actuator cam from an engaged position to a disengaged position, as clearly illustrated in FIGS. 4 and 5, respectively.

A first cam surface 58 disposed opposite the pawl teeth 49 engages a second cam surface 60 on the actuator cam 50, ensuring the teeth remain engaged. With the actuator cam so positioned, the pawl 46 can not disengage from the rack 48. This allowing the energy absorbing design of the column to immediately absorb energy upon the imposition of an axial compressive load in excess of a predetermined load. A wall 62 formed within actuator cam 50 assists disengagement of the pawl teeth 49 from the rack teeth 51. The wall 62 engages a tab 64 on the pawl 46 to rotate the pawl 46 thereby disengaging the pawl teeth 49 with the rack teeth 51. Once disengaged, the operator may telescope the steering column in or out to a desired position within a predetermined range of adjustment.

In a preferred embodiment, an energy absorbing device 66 may be operatively interconnected between the rack 48 and the main housing such that it can absorb energy during steering column stroke when the telescope lock 44 is engaged. As an example, a curl strap 68 could have one end attached to the lower portion of the main housing 13 with fasteners 70. The rack 48 is attached at an opposite end of the curl strap with fasteners 72. A guide 74 includes a lower channel 76 which rides over the end of the curl strap that is attached to the lower portion of the main housing 13. The guide 74 also includes an upper channel 78 to which the opposite end of the curl strap is securely fastened.

Referring now to FIGS. 1 and 7–9, a tilt lock 88, similar to the telescope lock, is used to lock a steering column in a tilted position. A pivot joint 80 in the upper shaft permits tilting of a tilt head 82 and the attached steering wheel (not shown). A sheathed cable 84 extends from an operating lever 86 accessible to the vehicle operator to a tilt actuator cam 89. Rotation of the operating lever 86 displaces the cable 84, which in turn unlocks or locks the tilt actuator cam 89 to allow or prevent adjustment of the steering wheel tilt angle.

A tilt rod 90 moves forward and aft to accommodate tilting of the tilt head. The tilt rod includes a set of teeth 92 on one surface to be engaged by a set of teeth 94 disposed on a mating surface of a second pawl 96. A tilt body 97 attaches to the telescopic housing and includes a guide pin 98 to limit tilt range and first and second guide apertures 100, 102 to maintain proper orientation of the tilt rod 90 during operation of the tilt head. A clevis 104 is formed in the end opposite the set of teeth 92 to provide a pivotable connection of the tilt rod 90 to the tilt head 82.

The clevis 104 includes a clevis aperture 106 for receiving a clevis pin 108 therethrough. Tilting of the tilt head 82 about pivot screws 110 is transmitted to the tilt rod 90 through the clevis pin 108.

In operation, a operator would have access to the lever to release the telescope lock 44. The operator then applies a force to the steering wheel to extend or retract the telescopic housing 26, which causes telescoping movement of the telescopic housing 26 with respect to the main housing, allowing the operator to position the steering wheel in a comfortable position. Accordingly, in this manner an operator may selectively telescope the steering wheel in and out.

When the operator wishes to tilt the steering wheel up or down, the operator would have access to a second lever to release the tilt lock allowing the steering wheel to be tilted. The operator can then apply a force to the steering wheel to rotate the tilt head 82 about the pivot screws 110, thus causing the steering wheel to tilt.

As can be seen in FIG. 6, if an axially compressive load in excess of a predetermined minimum is applied to the steering wheel, the telescopic housing 26 and upper shaft 22 will drive the pawl 46 and rack 48 in unison, transferring the energy of the motion into the curl strap. The curl strap effectively absorbs energy from the onset of the stroke, thereby providing the benefit of controlled energy absorption of the applied compressive load during steering column stroke. This energy absorption may be in addition to other energy absorbing mechanisms that can be employed for this purpose.

Various modifications and variations will, no doubt, occur to those skilled in the arts to which this invention pertain. For example, it should be obvious to those skilled in the art that the curl strap could be configured with varying shapes to provide specific energy absorption characteristics. Similarly, various materials, such as high strength steels or alloys could be used to vary the energy absorbing capacity of the curl strap. Yet another variation would be to substitute a single lever and cable assembly for actuating both the tilt and telescope mechanisms for the two levers and cables described above. Finally, the range of adjustability for both the telescope and tilt mechanism may be varied for the given package and design requirements simply by providing a longer rack or toothed portion of the tilt rod. These and all other variations which basically rely on the teaching with which this disclosure has advanced the art are properly considered within the scope of this invention as defined by the following claims.

We claim:

1. A steering column apparatus for use in a motor vehicle, said steering column apparatus comprising:

a main housing rigidly secured to said motor vehicle;

a telescoping assembly comprising:
  a telescopic housing slidably connected to said main housing;
  a first flexible cable driven by a first lever;
  a telescope lock driven by said first cable, said telescope lock comprising:
    a rack attached to said main housing, said rack including a first set of teeth;
    a pawl attached to said telescopic housing, said pawl including a second set of teeth disposed on one face thereof operative to meshingly engage said first set of teeth in a series of different relative positions to secure said telescopic housing relative to said rack; and
    an energy absorbing means operatively connected between said telescopic housing and said main housing for absorbing energy of movement of said telescopic housing with respect to said main housing upon application of an axial force in excess of a predetermined minimum force.

2. The steering column apparatus of claim 1, wherein said rack is securely disposed on said energy absorbing means so as to directly transfer motion of said telescopic housing to said energy absorbing means in any of said different relative positions.

3. The steering column apparatus of claim 1, wherein said rack is attached to said energy absorbing means.

4. The steering column apparatus of claim 3, wherein said telescope lock further comprises:
  a cam reciprocally driven by said first cable, said cam including a first camming surface.

5. The steering column apparatus of claim 1, wherein said energy absorbing means further comprises:
  a U-shaped curl strap having a first end attached to said main housing and a second end attached to said telescope lock; and
  a guide disposed between said first and second ends of said curl strap, said guide adapted to maintain a spaced relationship between said first and second ends during energy absorbing deformation of said curl strap.

6. A steering column apparatus for use in a motor vehicle having a steering wheel, said steering column apparatus comprising:
  a main housing rigidly secured to said motor vehicle;
  a telescoping assembly comprising:
    a telescopic housing slidably connected to said main housing;
    a first flexible cable driven by a first lever;
    a telescope lock operatively connected between said main housing and said telescopic housing and driven by said first cable for securing the telescopic housing with respect to said main housing;
    a tilt assembly comprising:
      a tilt head pivotably connected to said telescopic housing for supporting a steering wheel;
      a second flexible cable driven by a second lever;
      a tilt lock operatively connected between said tilt head and said telescopic housing and driven by said second cable for allowing the tilting of the steering wheel with respect to an operator; and
  an energy absorbing means operatively connected between said telescopic housing and said main housing for absorbing energy of movement of said telescopic housing with respect to said main housing upon application of a compressive force to the steering column apparatus in excess of a predetermined minimum force.

7. The steering column apparatus of claim 6, wherein said telescope lock further comprises:
  a rack attached to said main housing, said rack including a first set of teeth; and
  a pawl attached to said telescopic housing, said pawl including a second set of teeth disposed on one face thereof operative to meshingly engage said first set of teeth in a series of different relative positions to secure said telescopic housing relative to said rack under the application of said compressive force.

8. The steering column apparatus of claim 7, wherein said rack is securely disposed on said energy absorbing means so as to directly transfer motion of said telescopic housing to said energy absorbing means in any of said different relative positions.

9. The steering column apparatus of claim 6, wherein said telescope lock further comprises:
  a rack attached to said energy absorbing means, said rack including a first set of teeth; and
  a pawl attached to said telescopic housing, said pawl including a second set of teeth disposed on one face thereof operative to meshingly engage said first set of teeth in a series of different relative positions to secure said telescopic housing relative to said rack under the application of said compressive force.

10. The steering column apparatus of claim 6, wherein said telescope lock further comprises:
  a cam reciprocally driven by said first cable, said cam including a first camming surface and;
  a rack attached to said energy absorbing means, said rack including a first set of teeth; and
  a pawl attached to said telescopic housing, said pawl including a second camming surface disposed on one face thereof for engagement with said first camming surface and a second set of teeth disposed on a face opposite said second camming surface operative to meshingly engage said first set of teeth in a series of different relative positions to secure said telescopic housing relative to said rack under the application of said compressive force.

11. The steering column apparatus of claim 6, wherein said energy absorbing means further comprises:
  a U-shaped curl strap having a first end attached to said main housing and a second end attached to said telescope lock; and
  a guide disposed between said first and second ends of said curl strap, said guide adapted to maintain a spaced relationship between said first and second ends during energy absorbing deformation of said curl strap.

12. A steering column apparatus for use in a motor vehicle having a steering wheel, said steering column apparatus comprising:
  a main housing rigidly secured to said motor vehicle;
  a telescoping assembly comprising:
    a telescopic housing slidably connected to said main housing;
    a first flexible cable driven by a first lever;
    a telescope lock operatively connected between said main housing and said telescopic housing and driven by said first cable for securing the telescopic housing with respect to said main housing, said telescope lock comprising:
      a first cam reciprocally driven by said first cable, said first cam including a first camming surface;
      a first rack attached to said main housing, said first rack including a first set of teeth; and a first pawl attached to said telescopic housing, said first pawl including a second camming surface disposed on one face thereof for engagement with said first camming surface and a second set of teeth disposed on a face opposite said second camming surface operative to meshingly engage said first set of teeth in a series of different relative positions to secure said telescopic housing relative to said rack under the application of an axial force;

a tilt assembly comprising:

a tilt head pivotably connected to said telescopic housing for carrying a steering wheel;

a second flexible cable driven by a second lever;

a tilt lock operatively connected between said tilt head and said telescopic housing and driven by said second cable for allowing the tilting of the steering wheel with respect to an operator, said tilt lock comprising:

a second cam reciprocally driven by said second cable, said second cam including a third camming surface;

a tilt rod having one end pivotally attached to said tilt head and a third set of teeth disposed thereon; and a second pawl attached to said telescopic housing, said second pawl including a fourth camming surface disposed on one face thereof for engagement with said third camming surface and a fourth set of teeth disposed on a face opposite said fourth camming surface operative to meshingly engage said third set of teeth in a series of different relative positions to secure said tilt head relative to said telescopic housing under the application of an axial force.

\* \* \* \* \*